United States Patent
Facchini et al.

(10) Patent No.: US 6,362,873 B1
(45) Date of Patent: Mar. 26, 2002

(54) METHOD OF IMPROVING THE CONTRAST OF IMAGES OBTAINED USING THE PULSED IMAGE-ADDITION ESPI TECHNIQUE

(75) Inventors: Massimo Facchini, Malgesso; Alfredo Carlo Lucia, Osmate, both of (IT)

(73) Assignee: European Community, Luxembourg ( * ) Notice: Subject to any disclaimer, the term of this patent is extended or adjusted under 35 U.S.C. 154(b) by 0 days.

(21) Appl. No.: 09/547,352

(22) Filed: Apr. 11, 2000

Related U.S. Application Data

(63) Continuation of application No. PCT/EP98/06949, filed on Nov. 3, 1998.

(30) Foreign Application Priority Data

Nov. 4, 1997 (EP) .............................................. 97830569

(51) Int. Cl.⁷ ................................................. G01G 9/02
(52) U.S. Cl. ..................................................... 356/35.5
(58) Field of Search ............................... 356/35.5, 511, 356/512, 520

(56) References Cited

U.S. PATENT DOCUMENTS 5,481,356 A * 1/1996 Pouet et al. ............... 356/35.5

FOREIGN PATENT DOCUMENTS

| JP | 60/076604 | 3/1983 |
| WO | WO90/2930 A | 9/1989 |

OTHER PUBLICATIONS

Andrew J. Moore, et al., Phase Extraction From Electronic Speckle Pattern Interferometry Addition Fringes; 2219 Applied Optics 33: 7312–7320; (Nov., 1994).

Liu–Sheng Wang, et al., Additive–subtractive Speckle Interferometry: Extraction of Phase Data in Noisy Environments; Opt. Eng. 35(3) 794–801 (Mar., 1996).

* cited by examiner

Primary Examiner—Samuel A. Turner
(74) Attorney, Agent, or Firm—Frost Brown Todd LLC

(57) ABSTRACT

To improve the contrast of images obtained using the pulsed image-addition ESPI technique relative to a mechanically stressed object, a preliminary measuring cycle is performed, with the object in the unstressed condition, to obtain a predetermined number of interference images (110–160) differing from one another by a controlled phase shift of a fraction of the pulses traveling along one of the branches of the interferometer; a mean luminous intensity value is calculated (170) from the interference images, is memorized (180), and is subtracted (220) from each of the interference images obtained during the actual measuring cycle to improve the contrast of the images.

7 Claims, 3 Drawing Sheets

METHOD OF IMPROVING THE CONTRAST OF IMAGES OBTAINED USING THE PULSED IMAGE-ADDITION ESPI TECHNIQUE

This application is a continuation of Ser. No. PCT/EP98/06949 filed Nov. 3, 1998.

TECHNICAL FIELD

The present invention relates to a method of improving the contrast of images obtained using the pulsed image-addition ESPI technique.

BACKGROUND ART

When laser sources first came into use in the 60s, a curious phenomenon known as the speckle effect was observed, and which is produced when the surface of an object of a roughness comparable with the wavelength of visible light (450–700 nm) is illuminated by a beam of coherent light (e.g. a laser beam). In which case, the surface of the object assumes a typical granular appearance of randomly distributed light and dark specks. The speckle effect is caused by multiple interference of the object-diffused fields, which have randomly distributed phases on account of the roughness of the object being comparable with the wavelength, and is extremely difficult to analyze theoretically, mainly on account of the statistical characteristics of the roughness of the object and the coherence properties of the light used. Moreover, the statistical distribution of the luminous intensity of a speckle image has no direct relationship with the microscopic structure of the rough surface gene rating the image.

The ESPI (Electronic Speckle Pattern Interferometry) technique, which is known in its more general form, uses the speckle effect to accurately real-time monitor the deformation of mechanically stressed objects. More specifically, by subtracting or adding successive speckle images, the ESPI technique generates interference images showing correlation fringes, the arrangement of which is related instant by instant to the deformation of the object.

In the speckle image subtraction process, interference images are generated by first illuminating a substantially flat surface of the object by means of a laser beam to detect and digitize a first speckle image of the surface of the undeformed object; the object is then stressed mechanically and a second speckle image detected of the deformed object; and the second image is compared electronically with the first (e.g. by subtracting the grey levels of corresponding points of the two images) to obtain a final image (interferogram) showing correlation fringes of increasing density in the regions of the object undergoing maximum deformation. The luminous intensity of each point of the interferogram is given by the following equation:

$$I(x, y) = 4\sqrt{I_0 I_R} \left|\sin\left(\Phi + \frac{\Delta\Phi}{2}\right)\right|\left|\sin\left(\frac{\Delta\Phi}{2}\right)\right| \quad (1)$$

where $I_0$ is the intensity of the light backscattered by the object; $I_R$ is the intensity of a reference beam detected simultaneously with the backscattered light; $\Phi(x,y)$ is the random phase relative to distribution of the speckle light; and $\Phi\Delta(x,y)$ is the phase variation relative to the variation in the optical path generated by surface deformation of the object.

The above equation provides for determining actual deformation of the object from the correlation fringe pattern.

In the speckle image addition process, interference images are generated by adding, as opposed to subtracting, the two speckle images to obtain an interferogram similar to that of the subtraction process, but which is characterized by poor contrast of the fringes, and which is governed by the following equation:

$$I(x, y) = 2(I_0 + I_R) + 4\sqrt{I_0 I_R} \left|\cos\left(\Phi + \frac{\Delta\Phi}{2}\right)\cos\left(\frac{\Delta\Phi}{2}\right)\right| \quad (2)$$

As can be seen, in addition to a phase shift of the fringes as compared with those obtained using the subtraction process (so that maximum luminosity of the image-addition interferogram corresponds to minimum luminosity of that of the image-subtraction process), the image-addition interferogram also differs by comprising noise term $2(I_0+I_R)$, which represents a disturb term greatly reducing visibility (and therefore contrast) of the fringes.

By way of a solution to the problem, an alternative technique has been proposed whereby two successive interference images obtained using the addition process are subtracted one from the other to obtain further images of a luminous intensity according to the following equation:

$$I(x, y) = \left|2\sqrt{I_0 I_R}\cos\Phi - 2\sqrt{I_0 I_R}\cos\left(\Phi + \alpha + \frac{\Delta\Phi}{2}\right)\cos\frac{\Delta\Phi}{2}\right| \quad (3)$$

where $\alpha$ is the phase variation generated between the instants in which the two interference images are formed.

While improving contrast of the fringes, the above technique nevertheless still involves a random noise term $2\sqrt{I_0 I_R}\cos\Phi$, and a second set of fringes is formed due to the presence of term $\alpha$.

ESPI measurements to study the deformation of mechanically stressed objects may be made using interferometers of different optical configurations for measuring in-plane or out-of-plane deformation, as required, i.e. for determining deformation of the object in or outside the plane of the monitored surface (assuming the surface is substantially flat).

The above considerations also apply to ESPI measurements made using a continuously operating or pulsed laser. That is, the stressed object is subjected to laser pulses at a predetermined frequency to generate respective speckle images, which are detected and displayed, and which may also be subjected to addition and subtraction processes to obtain interferograms. Pulsed laser measurements provide for studying particularly rapid deformation processes by enabling comparison of closely succeeding deformation states (corresponding to the instants in which the laser pulses are emitted).

DISCLOSURE OF INVENTION

It is an object of the present invention to provide a method of improving the fringe visibility of ESPI measurements made using a pulsed source and the image-addition process.

According to the present invention, there is provide a method of improving the contrast of images obtained using the pulsed image-addition ESPI technique, and as described in claim 1.

BRIEF DESCRIPTION OF DRAWINGS

A preferred, non-limiting embodiment of the present invention will be described by way of example with reference to the accompanying drawings, in which.

BEST MODE FOR CARRYING OUT THE INVENTION

Figure 1:
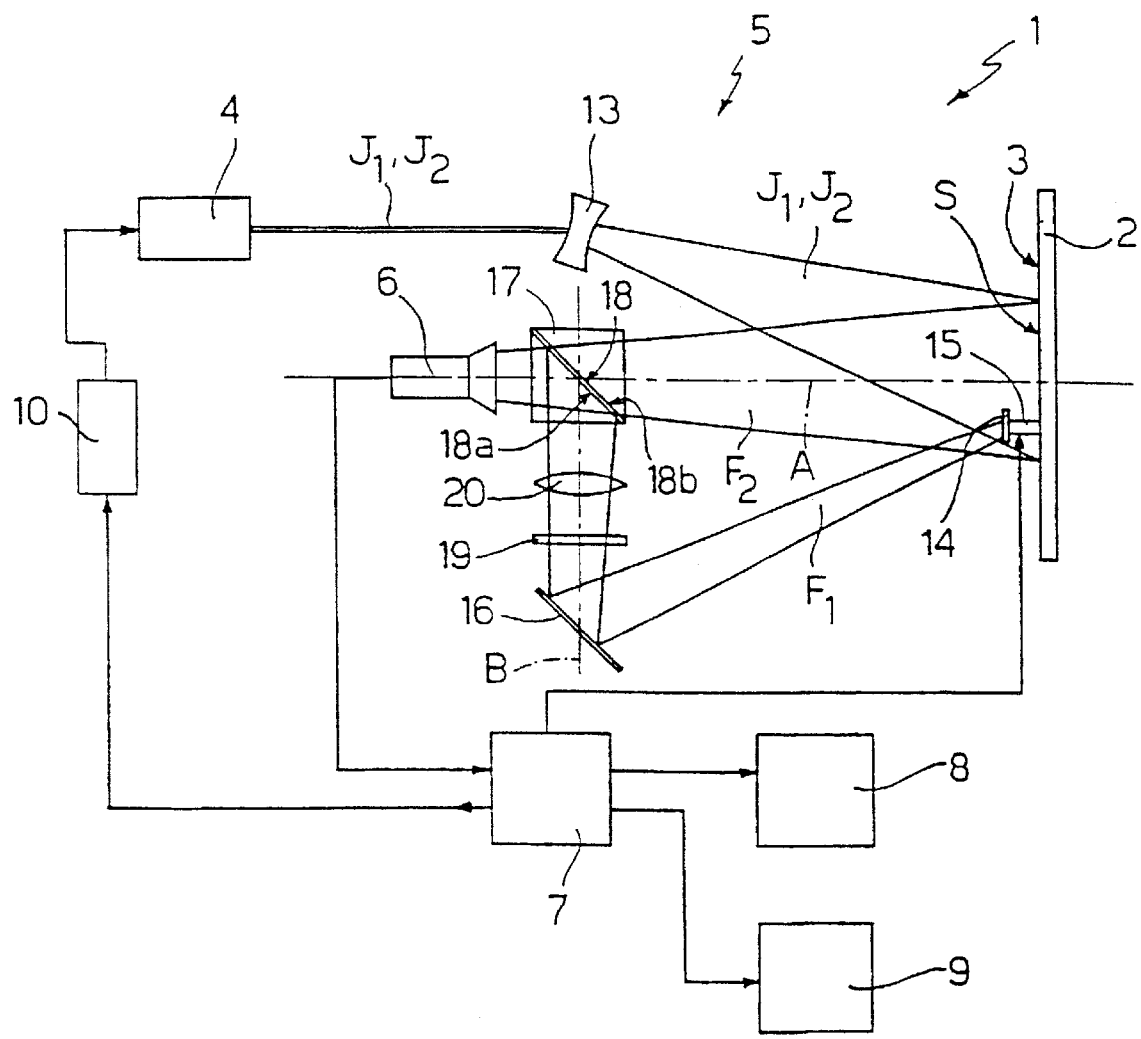
FIG. 1 shows, schematically, a first ESPI deformation detecting device implementing the method according to the present invention.

Number 1 in FIG. 1 indicates an ESPI deformation detecting device for detecting deformation of an object 2, e.g. a flat wall portion, stressed mechanically in known manner (not shown).

More specifically, device 1 provides for monitoring a substantially flat surface 3 of object 2, and for detecting out-of-plane deformation, i.e. extending in directions crosswise to surface 3.

Figure 2:
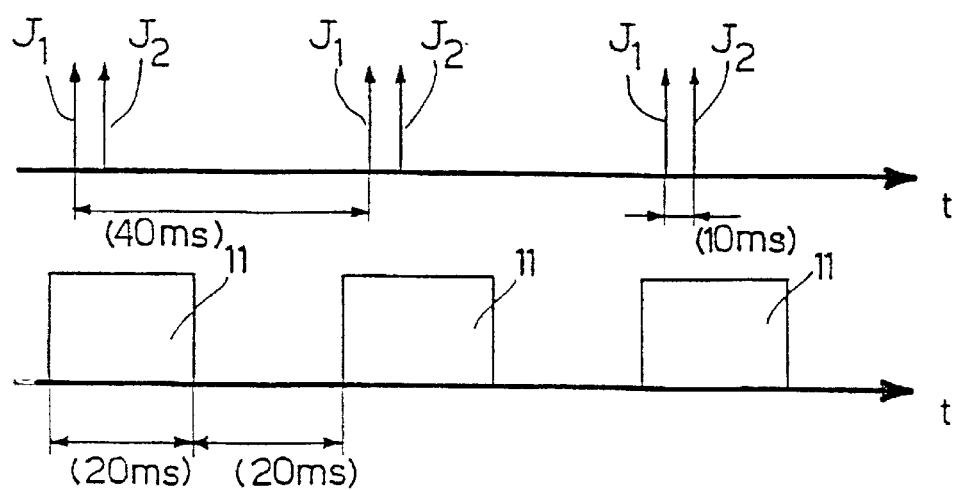
FIG. 2 shows the sequence of laser pulses emitted by a laser source of the FIG. 1 device.

Device 1 substantially comprises:

- a laser source 4 for emitting pairs of laser pulses $J_1$, $J_2$, as shown in FIG. 2;
- an optical assembly S for forming and directing laser pulses $J_1$ and $J_2$;
- a telecamera 6 facing surface 3, aimed along an axis A perpendicular to surface 3, and cooperating with optical assembly 5;
- a central processing unit 7 connected to telecamera 6, and comprising an image acquisition board (not shown) for acquiring and processing the images from telecamera 6;
- a black/white monitor 8 connected to central processing unit 7, and for displaying the images picked up by telecamera 6;
- a recording unit 9, e.g. a magnetic tape recording unit, also connected to central processing unit 7, and for recording the images picked up by telecamera 6; and
- a pulse generator 10 connected at the input to processing unit 7 and at the output to laser source 4, and for supplying laser source 4 with 25 Hz clock pulses.

Laser source 4 is an Nd-YAG type, and comprises internally two resonating cavities (not shown) for generating pairs of close laser pulses $J_1$, $J_2$ (FIG. 2) of approximately 10 ns duration and a wavelength corresponding to the colour green; each pair of pulses is separated from the following pair by 40 ms; pulses $J_1$ and $J_2$ in each pair are separated by a predetermined time interval, e.g. 10 μs; and laser source 4 is so oriented as to emit laser pulses $J_1$, $J_2$ towards object 2.

Telecamera 6 is a full-acquisition (i.e. noninterlaced) type, and comprises 20 ms acquisition time windows 11 (FIG. 2) separated from one another by 20 ms. As shown in FIG. 2, emission of pulses J and $J_2$ is synchronized with acquisition windows 11, i.e. each pair of pulses $J_1$, $J_2$ is emitted at a respective acquisition window 11.

Optical assembly 5 comprises a diverging lens (in particular a biconvex lens) 13 located along and slightly inclined with respect to the path of laser pulses $J_1$, $J_2$, and which provides for diverging and directing pulses $J_1$ and $J_2$ onto surface 3 of object 2 so as to illuminate a central area S of surface 3.

Optical assembly 5 also comprises a small flat mirror 14 fitted to surface 3 at a peripheral portion of area S; a piezoelectric translator 15 is mounted behind mirror 14 and controlled by central processing unit 7 by means of a digital-analog D/A board (not shown) to move mirror 14 in controlled manner in a direction perpendicular to surface 3; and mirror 14 is positioned facing telecamera 6, and provides for intercepting and reflecting a first peripheral fraction $F_1$ of each incoming pulse $J_1$ or $J_2$.

Optical assembly 5 also comprises a flat mirror 16 oriented at an angle of roughly 45° with respect to surface 3, and which provides for intercepting first fraction $F_1$ reflected by mirror 14, and in turn reflecting it along an axis B perpendicular to axis A.

Optical assembly 5 also comprises a beam splitter 17 located between telecamera 6 and surface 3, at the intersection of axes A and B, and in turn comprising a flat semireflecting surface 18 parallel to mirror 16 and defining an angle α of roughly 45° with respect to axes A and B.

On a first face 18a of semireflecting surface 18 facing telecamera 6, beam splitter 17 receives and partially reflects to telecamera 6 the first fraction $F_1$ reflected by mirrors 14 and 16. At the same tire beam splitter 17 receives, on a second face 18b of semireflecting surface 18, a second fraction $F_2$ of each pulse $J_1$ or $J_2$ backscattered by surface 3, and partially transmits it, superimposed on first fraction $F_1$, to telecamera 6.

Optical assembly 5 also comprises a filter 19 located along axis B, between mirror 16 and beam splitter 17, for reducing and rendering the luminous intensity of first fraction $F_1$ comparable with that of second fraction $F_2$; and a biconcave lens 20 located along axis B, between filter 19 and beam splitter 17, for converging first fraction $F_1$ onto face 18a of semireflecting surface 18.

Device 1 operates as follows.

When device 1 is turned on, processing unit 7 supplies pulse generator 10 with a 50 Hz control signal, which is converted into a 25 Hz clock signal and supplied to laser source 4. Laser source 4 therefore emits, every 40 ms, a pair of pulses $J_1$, $J_2$, which, on reaching lens 13, are diverged and directed onto surface 3 of object 2. For each of pulses $J_1$, $J_2$ impinging on surface 3, a first fraction $F_1$ is intercepted by mirror 14 and reflected towards mirror 16 by which it is again intercepted and directed along axis B towards beam splitter 17. First fraction $F_1$ is therefore directed through filter 19, by which it is reduced in intensity, and through lens 20, by which it is collimated, onto face 18a where part of it (roughly 50%) is reflected towards telecamera 6. At the same time, a second fraction $F_2$ of pulse $J_1$ or $J_2$ is backscattered directly by surface 3 onto face 18b of beam splitter 17, where part of it (roughly 50%) travels through face 18b to telecamera 6; and the parts of first and second fractions $F_1$, $F_2$ reaching the sensitive area of telecamera 6 are superimposed to generate a speckle interference image.

If $U_a$ and $U_b$ are the respective fields of first and second fractions $F_1$, $F_2$, the resulting intensity U observed by telecamera 6 is given by the following equation:

$$I = I_a + I_b + 2(I_a I_b)^{\frac{1}{2}} \cos(\Phi) \qquad (4)$$

where $I_a = U_a U_a^*$; $I_b = U_b U_b^*$; and $\Phi$ is the speckle phase which varies randomly in the image (the symbol * indicates the complex conjugate). For each pulse $J_1$, $J_2$ emitted by laser source 4, the telecamera therefore picks up a speckle image of object 2 in which surface 3 assumes a typical granular appearance of randomly arranged light and dark specks.

For each pair of pulses $J_1$, $J_2$ emitted by laser source 4, the sensitive area of telecamera 6 therefore receives two distinct speckle images offset by roughly 10 μs, received in the same acquisition window 11 of telecamera 6, and which are superimposed to generate a total interference image in which correlation fringes are distributed according to equation (2) below:

$$I(x, y) = 2(I_0 + I_R) + 4\sqrt{I_0 I_R} \left|\cos\left(\Phi + \frac{\Delta\Phi}{2}\right)\cos\left(\frac{\Delta\Phi}{2}\right)\right| \quad (2)$$

where, in this case, $I_R$ is the intensity of first fraction $F_1$, and $I_0$ the intensity of second fraction $F_2$. In this interference image, the correlation fringe pattern is related to the deformation (in particular, the deformation outside the plane defined by surface 3) of object 2 in the brief interval (i.e. roughly 10 $\mu$s) separating the emission of pulses $J_1$, $J_2$ in each pair.

As can be seen, equation (2) comprises noise term $2(I_0 + I_R)$, which greatly reduces contrast of the fringes.

According to the present invention, a method is implemented to eliminate, or at least reduce, the noise term, and which, briefly, comprises a preliminary measuring cycle of the object in the unstressed condition to calculate a reference value approximating noise term $2(I_0+I_R)$; the reference value is memorized and, during the actual measuring cycle of the stressed object, is retrieved and subtracted from each interferogram to improve visibility of the fringes.

As shown in the FIG. 3 flow chart, the preliminary measuring cycle commences with a block 100, which sets the value of a parameter N corresponding to the required number of steps, i.e. the number of pairs of laser pulses required to perform the preliminary measuring cycle, and which also zeroes a counter n, the function of which is described later on. Block 100 is followed by a block 110, which directs onto object 2 a first pair of laser pulses $J_1$, $J_2$ of the type already described.

Block 110 is followed by a block 120, which, by means of telecamera 6, picks up the superimposed speckle images generated by pulses $J_1$ and $J_2$ to obtain a total interference image according to equation (2) and which is digitized and memorized in the next block 130.

Block 130 is followed by a block 140, which increases the value of counter n by one unit (n=n +1), and which is followed by a block 150 in which the current value of counter n is compared with N. If n<N, i.e. if fewer than the required number of steps have been performed, block 150 goes on to a block 160 in which the central processing unit, by means of the D/A board, transmits a control signal to piezoelectric translator 15 to move mirror 14 in controlled manner and so phase shift fraction $F_1$ by a predetermined value. For example, mirror 14 may be so moved as to cause a $2\pi/N$ phase shift of fraction $F_1$; at which point, block 160 goes back to block 110.

Conversely, if n=N in block 150, i.e. if the required number of steps has been reached, block 150 goes on to a block 170, which retrieves and calculates the mean intensity of the N memorized total interference images to obtain a reference intensity $I_{ref}$ according to the equation:

$$I_{ref} = \langle 2(I_0 + I_R) + 2\sqrt{I_0 I_R}\cos\Phi\rangle = 2(I_0 + I_R) + 2\sqrt{I_0 I_R}\langle\cos\Phi\rangle \quad (5)$$

wherein:

$$\langle\cos\Phi\rangle = \int_0^{2\pi}\cos\Phi d\Phi = 0,$$

so that:

$$I_{ref} \cong 2(I_0+I_R) \quad (6)$$

that is, the mean intensity of the interference images equals (at least approximately) noise term $2(I_0+I_R)$.

In the next block 180, the value of reference term $I_{ref}$ (in this case, equal to the noise term) is memorized, thus completing the preliminary measuring cycle.

Figures 3, 4:
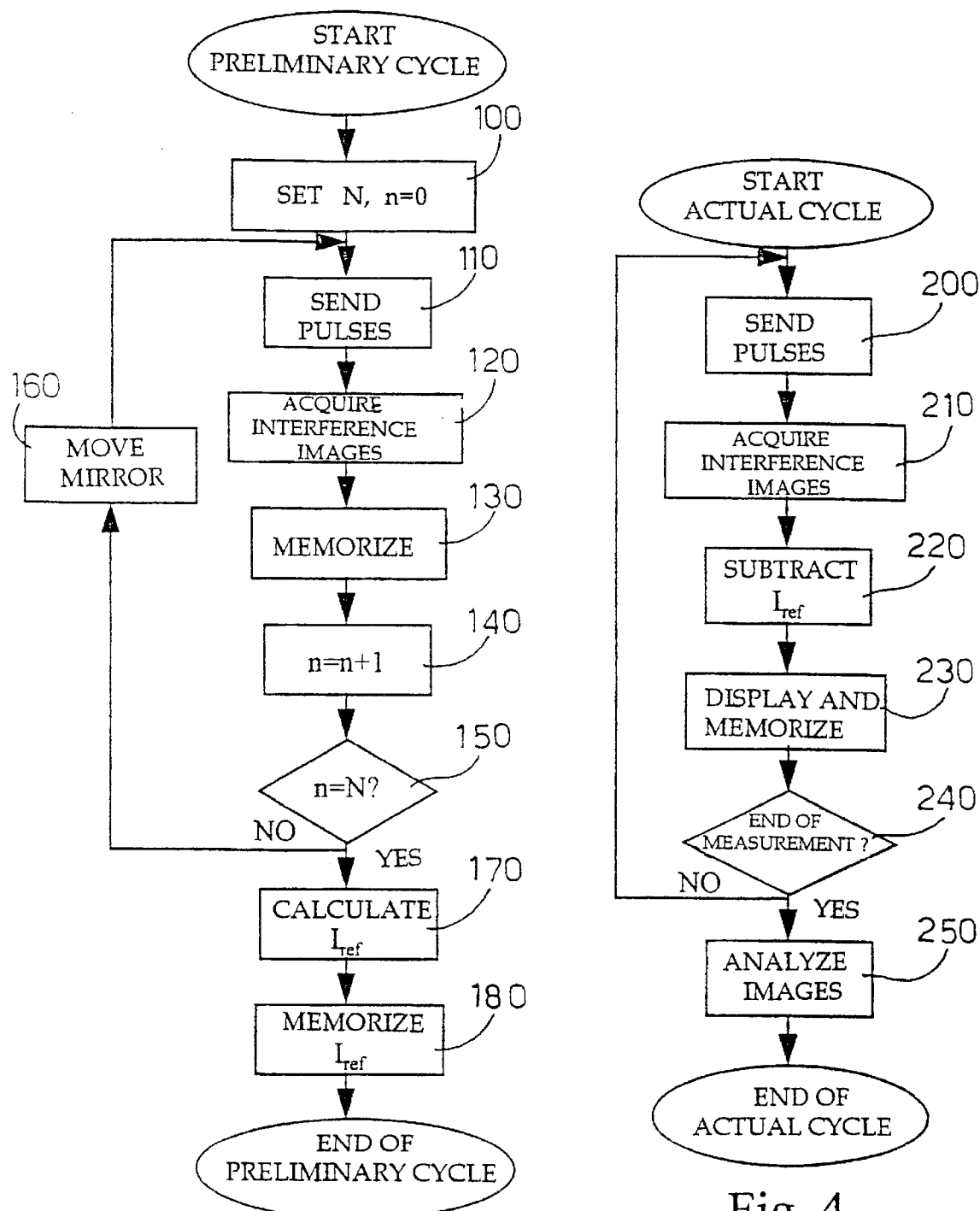
FIGS. 3 and 4 show flow charts of steps in the method according to the present invention.

As shown in FIG. 4, the actual measuring cycle, performed after the preliminary measuring cycle and with object 2 stressed mechanically, commences with a block 200, which directs onto the object a first pair of laser pulses $J_1$, $J_2$ of the type already described. Block 200 is followed by a block 210, which, by means of telecamera 6, picks up the superimposed speckle images generated by pulses $J_1$ and $J_2$ to obtain a total interference image according to equation (2). In the next block 220, the total interference image is digitized by central processing unit 7, and from it is subtracted, point by point, the absolute value $I_{ref}$ calculated in the preliminary cycle and expressed by equation (6), to obtain a corrected total interference image with the same fringe configuration as in the original, but with greatly improved contrast between the light and dark regions.

Mathematically, the subtraction operation consists in eliminating term $2(I_0+I_R)$ from equation (2) to obtain the following equation:

$$I(x, y) = 4\sqrt{I_0 I_R}\left|\cos\left(\Phi + \frac{\Delta\Phi}{2}\right)\cos\left(\frac{\Delta\Phi}{2}\right)\right| \quad (7)$$

Block 220 goes on to a block 230, in which the corrected total interference image is displayed on monitor 8 and possibly memorized by recording unit 9.

Block 230 goes on to a block 240, in which central processing unit 7 determines whether the measurement is completed, i.e. whether a predetermined number of images, sufficient to characterize the behaviour of object 2 under stress, has been acquired.

In the event of a negative response, block 240 goes back to block 200, which provides for supplying further pairs of pulses $J_1$, $J_2$. Conversely, block 240 goes on to a final block 250, in which the results of the measurement are processed in known manner to determine the deformation of object 2.

Figure 5:
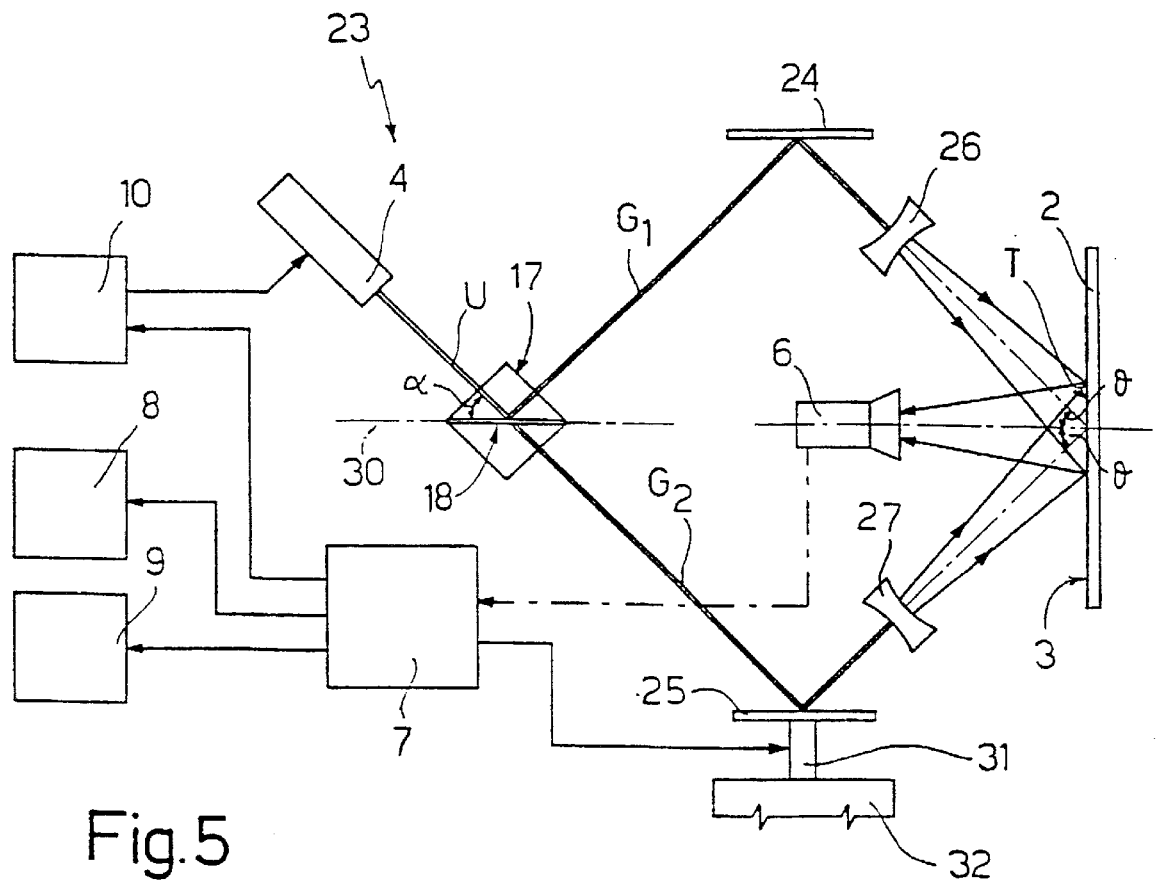
FIG. 5 shows, schematically, a second ESPI deformation detecting device implementing the method according to the present invention.

In addition to device 1, the above method may also be implemented by other ESPI measuring devices, such as the one shown and indicated as a whole by 23 in FIG. 5 and which provides for measuring in-plane deformation, i.e. for detecting surface deformation of object 2 in the plane defined by surface 3.

Device 23 comprises a laser source 4 and a beam splitter 17 similar to those of device 1. In this case, however, beam splitter 17 is located along the propagation path of pulses $J_1$, $J_2$ to cooperate directly with laser source 4, and its flat semireflecting surface 18 lies along an axis 30 substantially perpendicular to surface 3, so as to define a roughly 45° angle $\alpha$ with respect to the propagation path of pulses $J_1$, $J_2$.

Device 23 also comprises a pair of flat mirrors 24, 25 facing each other on either side of and parallel to optical axis 30; and a pair of diverging lenses 26, 27 interposed between surface 3 and respective mirrors 24, 25.

Device 23 also comprises a CCD telecamera 6 similar to that of device 1, located along axis 30 between beam splitter 17 and object 2, and for picking up surface 3.

Like device 1, device 23 comprises a central processing unit 7 connected to telecamera 6; a monitor 8; an image recording unit 9; and a pulse generator 10 for controlling laser source 4.

Finally, device 23 comprises a piezoelectric translator 31 fitted behind mirror 25, connecting mirror 25 to a fixed support 32, and which is controlled by central processing unit 7 to move mirror 25 in controlled manner in a direction perpendicular to its reflecting surface.

Device 23 operates as follows.

Each pulse $J_1$, $J_2$ emitted by laser source 4 is divided by beam splitter 17 into a first and second fraction $G_1$, $G_2$ directed onto respective mirrors 24, 25; first fraction $G_1$ is reflected by mirror 24 and diverged by lens 26 to illuminate a wide area T of surface 3; at the same time, second fraction $G_2$ is reflected by mirror 25 and diffused by lens 27 to also illuminate area T on top of fraction $G_1$; both fractions $G_1$, $G_2$ are backscattered by surface 3, and respective portions of them impinge on the sensitive area of telecamera 6 to form a speckle image. As with device 1, being acquired in the same acquisition window 11 of telecamera 6, the speckle images of pulses $J_1$ and $J_2$ in the same pair are superimposed on the sensitive area of telecamera 6 to form a total interference image, the point by point intensity of which is given by equation (2) wherein, in this case, $I_0$ and $I_R$ are the intensities of fractions $G_1$ and $G_2$.

In this case also, therefore, the method according to the invention may be applied by performing a preliminary measuring cycle as described above to calculate and memorize value $I_{ref}$, and by subsequently performing the actual measuring cycle, in which value $I_{ref}$ is subtracted from each digitized total interference image.

The advantages of the method according to the present invention will be clear from the foregoing description. In particular, it provides for greatly improving the fringe visibility of pulsed image-addition ESPI images in a straightforward, fully automatic manner by performing a brief preliminary measuring cycle, and by simply providing an additional piezoelectric translator for moving one of the mirrors during the preliminary cycle.

Clearly, changes may be made to the device as described and illustrated herein without, however, departing from the scope of the present invention.

In particular, fraction $F_1$ of device 1 and fraction $G_2$ of device 23 may be phase shifted using any conventional optical technique permitting controlled variation of the optical path of a beam of coherent light.

What is claimed is:

1. A method of improving the contrast of images obtained using the pulsed image-addition electronic speckle pattern interferometry technique; said interferometry technique being used to determine the deformation of a stressed object (2); said object (2) comprising at least one substantially flat surface (3) suitable for monitoring; and said interferometry technique comprising an actual measuring cycle performed with the object (2) under stress, and in turn comprising the steps of;

A) generating a first laser pulse ($J_1$) of a wavelength comparable with the roughness of said surface (3);

B) directing at least a first fraction ($F_1$; $G_1$) of said first laser pulse ($J_1$) onto said surface (3);

C) capturing, by means of viewing means (6) and together with a second fraction ($F_2$; $G_2$) of said first laser pulse ($J_1$), at least a portion of said first fraction ($F_1$; $G_1$) backscattered by said surface (3);

D) acquiring by means of said viewing means (6), a first speckle image formed by interference between said at least one portion of said first fraction ($F_1$; $G_1$) and said second fraction ($F_2$; $G_2$);

E) generating, after a predetermined time interval following generation of said first pulse ($J_1$), a second laser pulse ($J_2$) of a wavelength comparable with the roughness of said surface (3), and defining with said first pulse ($J_1$) a first pair of pulses ($J_1$, $J_2$);

F) repeating said steps B), C), D) for said second laser pulse ($J_2$) to obtain a second speckle image; said second speckle image being superimposed on said first speckle image to generate a low-contrast total interference image, the point by point luminous intensity of which is defined by an equation comprising a first term which is a function of the surface deformation of the object (2), and a second noise term ($2(I_0+I_R)$) determining the low contrast of said low-contrast total interference image;

G) repeating said steps A) to F) a predetermined number of times to obtain a sequence of said low-contrast total interference images said method being characterized by also comprising a preliminary measuring cycle (100–180) performed prior to said actual measuring cycle, with said object in the unstressed condition, and for determining a reference luminous intensity value ($I_{ref}$) approximately equal to said noise term ($2(I_0+I_R)$);

the method also comprising, after each step F) of said actual measuring cycle, the further step of:

H) subtracting (220) said reference luminous intensity value ($I_{ref}$) from each said low-contrast total interference image to obtain a respective high-contrast total interference image.

2. A method as claimed in claim 1, characterized in that the point by point luminous intensity of each said low-contrast total interference image is defined approximately by the following equation:

$$I(x, y) = 2(I_0 + I_R) + 4\sqrt{I_0 I_R} \left|\cos\left(\Phi + \frac{\Delta\Phi}{2}\right)\cos\left(\frac{\Delta\Phi}{2}\right)\right|$$

where $I_0$ is the luminous intensity of said captured portion of said first fraction ($F_1$; $G_1$), $I_R$ is the luminous intensity of said captured portion of said second fraction ($F_2$; $G_2$), $\Phi(x,y)$ is the random phase relative to distribution of the speckle light, and $\Delta\Phi(x,y)$ is the phase variation relative to the optical path variation generated by deformation of said surface (3);

and in that the point by point luminous intensity of each said high-contrast total interference image is defined approximately by the following equation:

$$I(x, y) = 4\sqrt{I_0 I_R} \left|\cos\left(\Phi + \frac{\Delta\Phi}{2}\right)\cos\left(\frac{\Delta\Phi}{2}\right)\right|.$$

3. A method as claimed in claim 1 or 2, characterized in that said preliminary measuring cycle comprises steps identical to said steps A) to F), and the further steps of:

I) varying the phase (160) of said second fraction ($F_2$; $G_2$) by a predetermined quantity at the end of each step F) in the preliminary cycle;

J) repeating said steps A) to F) and step I) a predetermined number of times (N) to generate a number of low-contrast total interference images phase shifted with respect to one another, and wherein each low-contrast total interference image comprises a phase variation with respect to a successive low-contrast total interference image;

K) calculating (170) said reference luminous intensity value ($I_{ref}$) by calculating the mean luminous intensity of said number of phase shifted low-contrast total interference images.

4. A method as claimed in claim 3, characterized in that said mean luminous intensity of said number of phase shifted low-contrast total interference images is calculated according to the following equation:

$$I_{ref} = \langle 2(I_0 + I_R) + 2\sqrt{I_0 I_R}\cos\Phi \rangle$$
$$= 2(I_0 + I_R) + 2\sqrt{I_0 I_R}\langle\cos\Phi\rangle$$
$$= 2(I_0 + I_R)$$

5. A method as claimed in claim 3 or 4, characterized in that said step I) comprises the step of intercepting and reflecting said second fraction ($F_2$; $G_2$) by means of at least one flat mirror (14; 25), and moving said mirror (14; 25) in controlled manner to vary the optical path of said second fraction ($F_2$; $G_2$) and effect said phase variation.

6. A method as claimed in claim 5, characterized in that said mirror (14; 25) is fitted to said surface (3) of said object (2).

7. A method as claimed in claim 5, characterized by comprising the steps of:

dividing said first laser pulse ($J_1$) into said first ($G_1$) and said second ($G_2$) fraction following said step A);

directing said second fraction ($G_2$) onto said surface (3) of said object (2) following said step I).

\* \* \* \* \*